United States Patent [19]
Zumbrunn et al.

[11] 3,711,402
[45] Jan. 16, 1973

[54] PROCESS FOR THE TREATMENT OF PHENOLATED INDUSTRIAL EFFLUENT

[75] Inventors: Jean-Pierre Zumbrunn, 95 Saint Gratien; Francois Crommelynck, 69 Lyon, both of France

[73] Assignee: L'Air Liquide, Societe Anonyme Pour L'Etude Et L'Exploitation Des Procedes Georges Claude, Paris, France

[22] Filed: May 8, 1972

[21] Appl. No.: 251,102

[30] Foreign Application Priority Data

May 13, 1971 France..................................7117293

[52] U.S. Cl.....................................................210/63
[51] Int. Cl......................................................C02c 5/04
[58] Field of Search...............................210/50, 59, 63

[56] References Cited

UNITED STATES PATENTS 2,311,314  2/1943  Reichert et al..........................210/50
3,510,424  5/1970  Zumbrunn................................210/63

OTHER PUBLICATIONS

Eisenhauer, H.R., J.WPCF, 1964, 36, pp.1116–1128.

*Primary Examiner*—Michael Rogers
*Attorney*—Alvin Browdy et al.

[57]  ABSTRACT

The present invention relates to a process for the complete purification of industrial effluent polluted by phenolated impurities wherein the degradation of the polluant is obtained by the action of an oxidizing reagent containing the $HSO_5^-$ anion. The oxidizing reagent is a member of the group constituted by monopersulphuric acid and its salts. The oxidizing reagent is an aqueous solution containing $HSO_5^-$ anion and containing furthermore $NH_4^+$, $HSO_4^-$ ions and, optionally, alkaline cations. The oxidizing reagent is an aqueous solution containing the $HSO_5^-$ anion and containing furthermore hydrogen peroxide and $H^+$, $HSO_4^-$ and $SO_4^-$ ions.

18 Claims, No Drawings

PROCESS FOR THE TREATMENT OF PHENOLATED INDUSTRIAL EFFLUENT

The present invention relates to a process for the complete purification of industrial effluent (industrial sewage, industrial residual water) by destruction of the phenols and hydroxylated aromatic compounds substituted on the core by electron donor groups, in solution. In this process, the phenols and other compounds are degraded by oxidation to products which have lost the aromatic character of the pollutant and are, consequently, very much more readily bio-degradable.

Phenolated residual water is found in the effluent of gasworks, coking plant, refineries, chemical synthesis works (manufacture and conversion of phenols), works manufacturing plastics materials (phenoplasts) and, in general, works in which there are processed coal, tars and their derivatives, pesticides, dyestuffs, etc.

The residual phenol concentrations vary widely, depending on the specific industry concerned. They may attain several grams per liter Now, it is known that the phenols are toxic to fish at levels as low as 0.1 mg/l. Furthermore, in water which is to be rendered drinkable by the addition of Javel water, a phenol content as low as 0.01 mg/l will suffice to impart an extremely disagreeable taste thereto, due to the formation of chlorophenols; it is thus necessary to process such water, in order to eliminate the phenols therefrom.

Hitherto, the processes for the purification of phenolated water have not been very numerous and, above all, they have not been totally effective. These known processes may be classified in accordance with two large categories.

First of all, the processes involving physical recuperation or elimination, operation either by liquid-liquid extraction by means of a solvent, steam distillation, absorption on active charcoal or on an ion-exchanger resin, or by a foaming process whereby a surface-active agent is added to the water and the phenol accumulates in the foam.

Then, among the best known processes involving chemical and biological destruction, there may be mentioned treatment by activated sludges and bacterial beds. Depending on the nature of the biological bed employed, it is possible to purify effluents of initially 50-100 mg/l of phenol (such as may issue from an installation for physical recovery such as those enumerated hereinabove) and to expel after several hours water which still contains some mg/l of phenol. Some extremely elaborate plants make it possible to go down as far as 0.2-0.5 mg/l, but only by dint of extremely strict monitoring of the composition of the water to be treated (pH, concentration in respect of phenol and foreign bodies, poisons of the bacterial bed).

It has also been proposed to effect oxidation treatment by ozone or permanganate; these two products are extremely costly; the second results in the production of large quantities of sludges.

Treatment by chlorine may be considered to be interesting, but it frequently produces chlorophenols and this almost always opposes the achievement of the desired aim, which is precisely to avoid the formation of such by-products.

Treatment by means of catalysed hydrogen peroxide is also known.

Apart from the chemical oxidation processes, all the other processes are never quantitative and always leave a certain residual phenol content ranging between 0.2 and several mg/l.

It is clear that a complete purification process has long been sought after, and numerous publications attest this fact. Among the latter, there has been mention of that relating to the oxidation of phenols by the couple hydrogen peroxide and a salt of ferrous iron (iron-II), conventionally known as the Fenton reagent; it acts on the organic compounds through intermediary of a highly oxidizing HO radical.

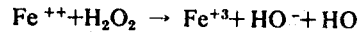

The reaction proposed by the authors (H.R. Eisenhauer, J. Water Pollution Control Federation, 1964, 36, 1116 to 1128) is as follows

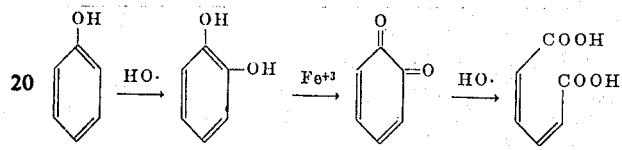

This mode of proceeding for the purification of effluent is among the most effective. In fact, the purification achieved is complete and relatively rapid. Unfortunately, this process has some disadvantages, i.e. the necessity of introducing ferrous iron which must be separated after processing, acid pH destruction and thus an attack on the cemented infrastructures which are sensitive to acidity and, finally, hydroxylation of the hydrocarbides which may be contained, together with the phenols, in the water to be purified. This disadvantage is clearly observed in the treatment of effluent from refineries which may contain, in addition to the phenols, between 5 and 50 ppm of hydrocarbides. In this case, if there are employed those quantities of reagents which are just necessary for the destruction of the phenols a surprising increase in the concentration of the latter is observed. During the experiments which resulted in the elaboration of the process constituting the subject of the invention, it was found that this increase in the phenol concentration was genuine and that it was due to the hydroxylating power of the reagent $H_2O_2$ — $Fe^{++}$. In order to achieve complete purification, it is thus necessary to add oxidizing reagent in a quantity such that it would be sufficient to hydroxylate all the reactive hydrocarbides and then to destroy the phenols thus formed and those initially present. This involves a consumption of reagent which may attain 100 to 200 times that foreseen.

All these disadvantages have made it necessary to seek a novel process having the following features and advantages:

complete degradation of phenols in all concentrations by opening the aromatic cycle;
functioning with a catalyst;
and at a pH which is sufficient not to attack the treatment tanks;
absence of secondary reactions (hydroxylation).

There has been found a novel process for the purification of effluent polluted by phenol, based on the exceptional oxidizing power of the anion $HSO_5^-$.

According to one object of the invention, the oxidizing reagent is a member of the group constituted by monopersulphuric acid.

According to a further object of the invention, and anion $HSO_5^-$ may be utilized in various forms:

a. aqueous solutions in which the monoperoxysulphuric anion is associated with ammonium, potassium or sodium ions and $HSO_4^-$ and $H^+$;
b. crystallized salt or a mixture of salts the active principle of which is monoperoxysulphate of potassium $HKSO_5$;
c. aqueous solutions containing, in addition to the oxidizing anion, $H^+$ and $HSO_4^-$ ions and molecules of $H_2O_2$, but free from metallic cation.

According to a variant of the invention, the said solutions contain 10 to 70% by weight of $HSO_5^-$ and up to 10% by weight of $H_2O_2$.

These various oxidizing reagents may be obtained by the reaction of hydrogen peroxide on oleum, sulphuric acid, or sulphuric chlorhydrin, or by the hydrolysis of dipersulphates $S_2O_8^{--}$.

The mechanism concerned in the reaction affording the destruction of the phenolated impurities is complex and depends on the composition of the oxidizing solution employed and on the proportion of reagents. On using a solution of monoperoxysulphuric acid analogous to the solution (c) mentioned hereinabove, a study of the reaction obtained permits the establishment of a mechanism in three phases:

According to the first phase, there are formed diphenols or their semi-quinonic derivatives (this latter hypothesis is the most probable).

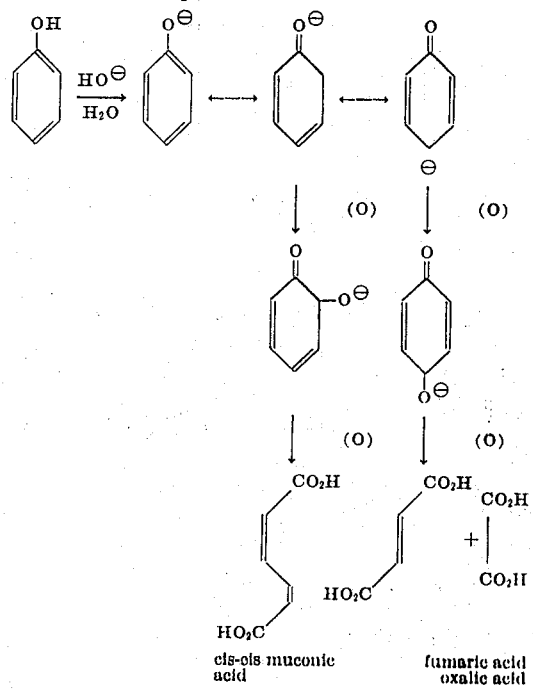

cis-cis muconic acid    fumaric acid    oxalic acid

The second phase commences immediately after the opening of the cycle.

and the third phase results from the further oxidation of the main substances which have formed.

It has been possible to show, in the final reaction products, the presence of oxalic and fumaric acids and even of considerable quantities of $CO_3^-$ ions, thus demonstrating that degradation has been effected up to complete mineralisation of the organic mole. In all cases, the aromatic structure is destroyed.

Monoperoxysulphuric acid permits the oxidation also of diphenols, polyphenols, substituted phenols — notably those carrying electron donor groups such as the diphenols (pyrocatechol, hydroquinone), resorcinol and the cresols which, with simple phenol, are the phenolated impurities most frequently encountered in aqueous industrial effluent; the reaction mechanisms are analogous to those described with reference to $C_6H_5OH$.

This very thorough degradation involves the utilization of a relatively large proportion of oxidizing reagents relative to the phenol to be destroyed; however, this proportion depends also on the type of oxidizing reagent selected; in all cases, at least one mole of $HSO_5^-$ per mole of phenol is necessary.

With a solution of type (a), it is to be admitted that, if the oxygen is added "all at once", it will be necessary to employ a quantity of reagent such that the molar ratio $R = HSO_5^-/C_6H_5OH \geq 50$ in order to obtain total purification in a sufficiently short period of time. The reaction time will be the shorter in proportion as the reagent excess is larger; thus, if $R = 240$, a solution containing 50 mg/l of phenol will be purified in 5 minutes. However, for reasons of economy, it is possible to operate in a plurality of steps; first of all, treatment is effected with a reagent ratio $\geq 1$, preferably near to 3; in a short period of time, a very consideration diminution in the phenol content is achieved; there is then effected a further addition of oxidizing reagent, in such manner that R calculated on the fresh phenol concentration is higher than or equal to 50, and so on until total disappearance of the phenol is achieved; in general, a treatment employing two oxidizing additions alone is sufficient.

The oxidizing solutions of type (c) are more reactive and the destruction of the phenol may be completed by operating in a single stage with a relatively small proportion of monoperoxysulphuric acid, such that the ratio $R = HSO_5^- / C_6H_5OH$ is equal to 7.

According to a variant of the invention, there is introduced into the residual waters an association of reagents which is capable of producing the monopersulphuric $HSO_5^-$ anion, the said association being constituted by a compound which is a generator of active oxygen in a mixture with sulphuric acid, oleum or sulphuric chlorhydrin. The active oxygen generating compound is selected from the group based on hydrogen peroxide. In addition to this compound, the mineral or organic hydroperoxidates, such as the perborates, alkaline percarbonates, perpyrophosphates, urea peroxide, and also the alkaline and alkaline-earth mineral peroxides constitute active oxygen generating compounds which are of significance to the invention.

The process utilizing this reagent obviates the disadvantages of the processes mentioned in the description of the prior art and possesses, in contradistinction thereto, all the properties indicated hereinabove.

The mode of carrying into effect is extremely simple, the treatment is effected at ambient temperature and it suffices to mix the oxidizing reagent with the effluent, observing a pH higher than 7, whatever the source of the oxidizing reagent utilized and preferably close to 9 – 10. The disappearance of the phenols is generally obtained rapidly.

The process of the invention makes it possible to treat effluents the phenol concentration of which ranges between 0.1 mg/l and 20 g/l.

The $HSO_5^-$ anion may be introduced on a single occasion only or on several different occasions. It has been found that the introduction of the $HSO_5^-$ anion several times permits the achievement of a diminution in the quantities of oxidizing agent employed.

The novel process described has, relative to that involving the use of hydrogen peroxide, the considerable advantage that it is not limited by the secondary reactions characteristic of the Fenton reagent.

It has in fact been shown that a solution containing the $HSO_5^-$ ion is capable of totally purifying a phenolic effluent without producing parasite hydroxylation reactions. In order to demonstrate this, the process is applied experimentally to a refinery effluent containing 1.5 mg/l of phenol and approximately 20 ppm of hydrocarbides. The nature of the hydrocarbides is not well known, but what is concerned is a mixture of aromatics and aliphatics. The aromatic fraction is thus capable of being hydroxylated.

The influence of the hydrocarbides, in this precise case, has no more than a "slowing-down" significance which may be compensated-for by a slight increase in the reagent excess. Thus, employing an aqueous solution of $HSO_5^-$ ion at a pH of 9 – 10, total purification is achieved, without secondary reactions, with R = 180, in 90 to 120 mn. A 120 ratio affords the same result, but in 3 to 4 hours. The hydrocarbide content may vary between 5 and 20 — for example 30 ppm, without greatly influencing the result. On the other hand, the employment of hydrogen peroxide in accordance with the principle of the Fenton reaction requires for treatment as complete as this, the utilization of a reagent excess which varies with the hydrocarbide content, since it is necessary to take account of secondary reactions. Thus, if $R = H_2O_2$/phenol, the following values must be attributed to this ratio:

R = 600 for a solution containing 1 mg/l phenol and 25 mg/l hydrocarbides
R = 190 for a solution containing 1 mg/l phenol and 10 mg/l hydrocarbides
R = 120 for a solution containing 1 mg/l phenol and 5 mg/l hydrocarbides
R = 10 for a solution containing 1 mg/l phenol without hydrocarbides.

The results set forth hereinabove, and also those of the examples, have been monitored by the amino antipyrine analytic method.

The limit of sensitivity under the test conditions in a few hundredths of a ppm of phenol. If this control produces a zero result, it may be affirmed that the effluent treated contains no more phenol, polyphenols or quinones.

Some examples which are intended to illustrate the invention are given hereinbelow, by way of non-limitative example.

Examples I to VII hereinbelow correspond to tests effected with oxidizing solutions of type (a).

EXAMPLE I

To an aqueous solution containing 50 mg/l of phenol there is added an aqueous solution of peroxymonosulphuric anion obtained from the hydrolysis of ammonium dipersulphate for example and containing the equivalent of 200 g/l of $H_2SO_5$.

With a quantity of 37.4 ml of peracid solution per liter of effluent, i.e., a ratio $HSO_5^-/C_6H_5OH = 120$, complete elimination of the phenol is obtained in 30 minutes at ambient temperature; such elimination is demonstrated by the amino antipyrine analysis method which gives a zero result on the treated solution.

The pH of the reaction is maintained at a value of 9 – 10 by the addition of an alkali. Most frequently, the alkaline product utilized is sodium hydroxide in an aqueous solution.

If a ratio $HSO_5^-/C_6H_5OH = 90$ is employed, the purification treatment is less rapid. In fact, 0.1 mg/l of phenol is revealed after a contact time of 1 hour.

EXAMPLE II

The purification is effected of an aqueous 50 mg/l phenol solution under the conditions described with reference with Example I, but the quantity of oxidizing reagent is doubled, i.e., 74.8 ml of an aqueous solution equivalent to a 200 g/l monopersulphuric acid. The ratio $HSO_5^-/C_6H_5OH$ employed is then 240. Purification is total in 5 minutes, at ambient temperature.

EXAMPLE III

Under the conditions of Example I, an aqueous 0.5 mg/l phenol solution is operated upon. The ratio $HSO_5^-/C_6H_5OH = 120$ necessitates the addition of 0.38 ml of the aqueous solution equivalent to a 200 g/l $H_2SO_5$ monopersulphuric acid. Disappearance of the phenol is total in 90 minutes.

Smaller ratios involve longer and more incomplete treatments, as compared with the amino antipyrine method. Thus, with a ratio of 90, 0.1 mg/l of phenol remains after 4 hours.

EXAMPLE IV

In this example, there is described a purification operation effected on an industrial effluent discharged from a petrol refinery. The said effluent contains 1.5 mg/l of phenol and 20 mgl/ of a mixture of aliphatic and aromatic hydrocarbides.

The results are identical with those of Example III, but the presence of hydrocarbides requires an increase of the ratio $HSO_5^-/C_6H_5OH$ up to 180.

A 120 ratio results in purification which is equally complete, but in 3 hours to 4½ hours, the hydrocarbide content varying between 5 and 20 mg/l.

EXAMPLE V

A liter of solution containing 1.5 g of phenol per 1080 ml of an aqueous solution containing the monopersulphuric anion at a concentration equivalent to 200 g/l of $H_2SO_5$, i.e., a ratio $HSO_5^-/C_6H_5OH = 120$, is treated.

The pH is maintained at 9 – 10 by the addition of 400 g/l of caustic soda. Total purification, i.e., purification affording a negative amino-antipyrine dosage reaction, is obtained in 60 minutes.

EXAMPLE VI 1 liter of solution containing 50 mg/l of phenol per 0.95 ml of peroxymonosulphuric anion solution and containing the equivalent of 200 g/l of $H_2SO_5$ is treated; this corresponds to a ratio $HSO_5^-/C_6H_5OH = 3$.

After 30 minutes of contact at ambient temperature, the amino antipyrine analysis shows that there remains no more than 0.6 mg/l of phenol. There is then added 0.46 ml of oxidizing solution ($HSO_5^-/C_6H_5OH = 120$) and after 90 minutes total elimination of the phenol has been achieved.

The total consumption of oxidizing reagent is only 1.4 ml of solution per liter of effluent to be treated.

EXAMPLE VII

The table given hereinbelow will make it possible to appreciate the reactivity of the $HSO_5^-$ ion relative to various substituted phenols.

Treatment is effected at pH 10 with a ratio $HSO_5^-/C_6H_5OH = 7$ of the solutions containing 25 ppm (parts per million) of phenol, ortho- or meta-cresol. The elimination of the phenols is measured by amino antipyrine analysis. The results are expressed as a percentage of phenol remaining after a time $t$ ( in minutes)

| t m. | phenol | o.-cresol | m.-cresol |
|------|--------|-----------|-----------|
| 0    | 100    | 100       | 100       |
| 2    | 90.1   | 89.6      | 68        |
| 5    | 57.6   | 58        | 1.6       |
| 10   | 27.6   | 9.2       | 0         |
| 15   | 15.5   | 1.04      |           |
| 20   | 9.1    | 0.6       |           |

EXAMPLE VIII

There is treated, at pH 10, a solution of 25.8 ppm of phenol, by means of a solution of monopersulphuric acid analogous to the solution of type (c), containing 520 g/l of $H_2SO_5$, and having a molar ratio of reagent R = $HSO_5^-/C_6H_5OH = 7$. After 10 minutes of contact, the phenol concentration measured by the amino antipyrine method is zero. On restoring the mixture to an acid pH, a vigorous evolution of carbon dioxide gaz is observed, showing that a portion of the organic carbon has been mineralised.

EXAMPLE IX

By means of a monopersulphuric acid solution of type c, containing 525 g/l of $H_2SO_5$, there is treated an aqueous refinery effluent containing 1.5 ppm of phenol and reducing products in quantities such that the oxygen chemical requirement is of the order of 100 to 200. Operation is effected at pH 10 with a ratio of reagent $HSO_5^-/C_6H_5OH = 100$. The destruction of the phenol is followed by amino antipyrine dosing.

After 25 m, there remains no more than 0.5 ppm of phenol

After 18 m, there remains no more than 0.2 ppm of phenol

After 120 m, there remains no more than 0.1 ppm of phenol

After 180 m, there remains no more than <0.01 ppm of phenol

What we claim is:

1. A process for the complete purification of industrial effluent polluted by phenolated impurities by conversion of said impurities by the action of an oxidizing reagent containing the $HSO_5^-$ anion, comprising mixing with said industrial effluent an amount of said $HSO_5^-$ anion sufficient to substantially completely destroy the aromatic structure of said phenolated impurities present in said effluent, said sufficient amount comprising at least one mole of $HSO_5^-$ per mole of phenol.

2. A purification process according to claim 1, wherein the oxidizing reagent is monopersulphuric acid or its salts.

3. A purification process according to claim 1, wherein the oxidizing reagent is an aqueous solution containing the $HSO_5^-$ anion and additionally containing $NH_4^+$, $HSO_4^-$ ions and, optionally, alkaline cations.

4. A purification process according to claim 1, wherein the oxidizing reagent is an aqueous solution containing the $HSO_5^-$ anion and additionally containing hydrogen peroxide and $H^+$, $HSO_4^-$ and $SO_4^=$ ions.

5. A purification process according to claim 1, characterized in that the oxidizing reagent is a salt or a mixture of salts the active principle of which is monoperoxysulphate of potassium $HKSO_5$.

6. A purification process according to claim 1, wherein there is introduced into the residual waters an association of reagents capable of engendering the peroxymonosulphuric $HSO_5^-$ anion.

7. A purification process according to claim 6, wherein the association of reagents is constituted by an active oxygen generating compound mixed with sulphuric acid, oleum or sulphuric chlorhydrin.

8. A purification process according to claim 6, wherein the active oxygen generator is a member of the group constituted by hydrogen peroxide, the mineral or organic hydroperoxides such as the perborates, alkaline percarbonates, the perpyrophosphates, urea peroxide, the alkaline and alkaline earth mineral peroxides.

9. A purification process according to claim 1, wherein the treatment of the effluent is effected at a pH higher than 7.

10. A purification process according to claim 1, wherein the treatment is effected at ambient temperature.

11. A purification process according to claim 3, wherein the treatment is effected, utilizing a reactive $H_2SO_5$/ phenol molar ratio close to 50.

12. A purification process according to claim 4, wherein the treatment is effected utilizing a reactive $H_2SO_5$/ phenol molar ratio close to 7.

13. A purification process according to claim 1, characterized in that the $HSO_5^-$ anion is mixed with said effluent in one stage.

14. A purification process according to claim 1, characterized in that the $HSO_5^-$ anion is mixed with said effluent in plural stages.

15. A process according to claim 14, characterized in that the quantities of $HSO_5^-$ anion are 3 moles per mole of phenol to be oxidized for the first addition — and at least 50 moles per mole of phenol — calculated on the residual phenolic content after the first treatment — for the following addition.

16. A purification process according to claim 1, wherein the phenol concentration of the effluent to be treated ranges between 0.1 mg/l and 20 g/l.

17. A purification process according to claim 1, wherein the pollutant phenol is a dihydroxybenzene, such as pyrocatechol, resorcinol and hydroquinone.

18. A purification process according to claim 1, wherein the polluting phenol is a methylphenol member of the group constituted by o.-cresol, m.-cresol and p.-cresol.

* * * * *